(12) United States Patent
Parekh et al.

(10) Patent No.: US 9,083,538 B2
(45) Date of Patent: Jul. 14, 2015

(54) METHODS AND APPARATUS FOR CREATION AND TRANSPORT OF MULTIMEDIA CONTENT FLOWS TO A DISTRIBUTION NETWORK

(75) Inventors: Nileshkumar J. Parekh, San Diego, CA (US); Ravinder Paul (Rob) Chandhok, Poway, CA (US); Ranganathan Krishnan, San Diego, CA (US); An Mei Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1493 days.

(21) Appl. No.: 11/298,279

(22) Filed: Dec. 9, 2005

(65) Prior Publication Data

US 2006/0159069 A1 Jul. 20, 2006
US 2012/0044929 A9 Feb. 23, 2012

Related U.S. Application Data

(63) Continuation-in-part of application No. 11/111,050, filed on Apr. 20, 2005.

(60) Provisional application No. 60/670,946, filed on Apr. 12, 2005, provisional application No. 60/634,977, filed on Dec. 9, 2004.

(51) Int. Cl.
*H04L 12/66* (2006.01)
*H04L 12/18* (2006.01)
*H04L 12/761* (2013.01)
(Continued)

(52) U.S. Cl.
CPC ............... *H04L 12/18* (2013.01); *H04L 45/16* (2013.01); *H04L 65/80* (2013.01); *H04L 67/26* (2013.01)

(58) Field of Classification Search
USPC .................................. 370/352; 709/246, 226
See application file for complete search history.

(56) References Cited

U.S. PATENT DOCUMENTS

| 5,408,526 A | 4/1995 | McFarland et al. |
| 5,552,833 A | 9/1996 | Henmi et al. |

(Continued)

FOREIGN PATENT DOCUMENTS

| EP | 1294165 A1 | 3/2003 |
| EP | 1341366 | 9/2003 |

(Continued)

OTHER PUBLICATIONS

International Search Report—International Search Authority—European Patent Office PCT/US05/014113.

(Continued)

*Primary Examiner* — William Deane, Jr.
(74) *Attorney, Agent, or Firm* — The Marbury Law Group, PLLC

(57) ABSTRACT

Methods and apparatus for creation and transport of multimedia content flows to a distribution network. The system includes a method for transporting a content flow to an access network for distribution to devices coupled to the access network. The method includes transmitting a request message to add the content flow to the access network, wherein the request message comprises one or more flow parameters associated with the content flow. The method also includes receiving a response message indicating that the content flow associated with the one or more flow parameters will be added to the access network, and delivering the content flow to the access network.

40 Claims, 7 Drawing Sheets

(51) Int. Cl.
*H04L 29/06* (2006.01)
*H04L 29/08* (2006.01)

(56) References Cited

U.S. PATENT DOCUMENTS

| | | |
|---|---|---|
| 5,600,573 A | 2/1997 | Hendricks et al. |
| 5,630,119 A | 5/1997 | Aristides et al. |
| 5,635,918 A | 6/1997 | Tett |
| 5,657,072 A | 8/1997 | Aristides et al. |
| 5,666,645 A | 9/1997 | Thomas et al. |
| 5,742,905 A | 4/1998 | Pepe et al. |
| 5,852,717 A | 12/1998 | Bhide et al. |
| 5,878,351 A | 3/1999 | Alanara et al. |
| 6,035,304 A | 3/2000 | Machida et al. |
| 6,075,526 A | 6/2000 | Rothmuller |
| 6,091,961 A | 7/2000 | Khalil |
| 6,223,210 B1 | 4/2001 | Hickey |
| 6,536,041 B1 | 3/2003 | Knudson et al. |
| 6,580,916 B1 | 6/2003 | Weisshaar et al. |
| 6,625,460 B1 | 9/2003 | Patil |
| 6,728,530 B1 | 4/2004 | Heinonen et al. |
| 6,961,560 B2 | 11/2005 | Hermann et al. |
| 6,963,725 B2 | 11/2005 | Kato |
| 6,965,770 B2 | 11/2005 | Walsh et al. |
| 6,996,393 B2 | 2/2006 | Pyhalammi et al. |
| 7,073,244 B2 | 7/2006 | Lazaridis et al. |
| 7,248,860 B2 | 7/2007 | Kamdar et al. |
| 7,302,057 B2 * | 11/2007 | Rotholtz et al. ............ 380/200 |
| 7,392,039 B2 | 6/2008 | Souissi et al. |
| 7,409,421 B2 | 8/2008 | Sugihara |
| 7,411,868 B2 * | 8/2008 | Kohmoto ................. 368/10 |
| 7,415,281 B2 | 8/2008 | Ahn |
| 7,472,075 B2 | 12/2008 | Odinak et al. |
| 7,536,447 B1 | 5/2009 | O'Neil |
| 7,546,383 B2 * | 6/2009 | Smith ..................... 709/246 |
| 7,801,480 B2 | 9/2010 | Becker |
| 7,912,457 B2 | 3/2011 | Chandhok et al. |
| 7,917,128 B2 | 3/2011 | Niekerk et al. |
| 7,979,055 B2 | 7/2011 | Watanabe et al. |
| 8,032,914 B2 | 10/2011 | Rodriguez |
| 2002/0035607 A1 | 3/2002 | Checkoway et al. |
| 2002/0068558 A1 | 6/2002 | Janik |
| 2002/0090932 A1 | 7/2002 | Bhatia et al. |
| 2002/0135698 A1 | 9/2002 | Shinohara |
| 2002/0143976 A1 | 10/2002 | Barker et al. |
| 2002/0162106 A1 | 10/2002 | Pickover et al. |
| 2003/0009770 A1 | 1/2003 | Tantawy et al. |
| 2003/0018794 A1 | 1/2003 | Zhang et al. |
| 2003/0026231 A1 * | 2/2003 | Lazaridis et al. ............ 370/338 |
| 2003/0028876 A1 | 2/2003 | Eguchi et al. |
| 2003/0032409 A1 | 2/2003 | Hutcheson et al. |
| 2003/0084108 A1 | 5/2003 | Syed |
| 2003/0093530 A1 * | 5/2003 | Syed ..................... 709/226 |
| 2004/0045029 A1 | 3/2004 | Matsuura |
| 2004/0083287 A1 | 4/2004 | Gao et al. |
| 2004/0133467 A1 | 7/2004 | Siler |
| 2004/0215811 A1 * | 10/2004 | Bar et al. .................. 709/232 |
| 2004/0230664 A1 | 11/2004 | Bowers et al. |
| 2005/0022237 A1 | 1/2005 | Nomura |
| 2005/0254440 A1 | 11/2005 | Sorrell |
| 2006/0159069 A1 | 7/2006 | Parekh et al. |
| 2006/0174271 A1 | 8/2006 | Chen et al. |
| 2007/0044121 A1 | 2/2007 | Parekh et al. |
| 2007/0214482 A1 | 9/2007 | Nguyen |
| 2010/0146559 A1 | 6/2010 | Lee et al. |
| 2010/0279681 A1 | 11/2010 | Ahmad et al. |
| 2011/0202659 A1 | 8/2011 | Chandhok et al. |

FOREIGN PATENT DOCUMENTS

| | | |
|---|---|---|
| JP | 56110372 | 9/1981 |
| JP | 4045632 | 2/1992 |
| JP | 2000115165 A | 4/2000 |
| JP | 2001211431 A | 8/2001 |
| JP | 2001216263 A | 8/2001 |
| JP | 2001275055 A | 10/2001 |
| JP | 2002007258 A | 1/2002 |
| JP | 2002101127 A | 4/2002 |
| JP | 2002112155 A | 4/2002 |
| JP | 2002141941 A | 5/2002 |
| JP | 2002247091 A | 8/2002 |
| JP | 2002259381 A | 9/2002 |
| JP | 2002271383 A | 9/2002 |
| JP | 2002305773 | 10/2002 |
| JP | 2002314546 | 10/2002 |
| JP | 2002335256 A | 11/2002 |
| JP | 2003108457 | 4/2003 |
| JP | 2003143224 A | 5/2003 |
| JP | 2003152785 A | 5/2003 |
| JP | 2003169087 A | 6/2003 |
| JP | 2003179919 A | 6/2003 |
| JP | 2003216869 A | 7/2003 |
| JP | 2003283799 A | 10/2003 |
| JP | 2004096654 A | 3/2004 |
| JP | 2004145520 A | 5/2004 |
| JP | 2004274700 A | 9/2004 |
| JP | 2004320489 A | 11/2004 |
| JP | 2004348494 A | 12/2004 |
| JP | 2005012655 A | 1/2005 |
| KR | 2003-0022838 | 3/2003 |
| WO | 9822886 | 5/1998 |
| WO | 0056067 | 9/2000 |
| WO | 0064177 | 10/2000 |
| WO | 0069101 | 11/2000 |
| WO | WO 00/74322 A | 12/2000 |
| WO | WO0115444 | 3/2001 |
| WO | WO02052811 A1 | 7/2002 |
| WO | 02084454 | 10/2002 |
| WO | WO03/019861 A | 3/2003 |
| WO | 03063416 A1 | 7/2003 |
| WO | 03071803 | 8/2003 |
| WO | WO2005107216 | 11/2005 |

OTHER PUBLICATIONS

International Search Report—International Search Authority—European Patent Office PCT/US05/044814.

Written Opinion—PCT/US05/044814, International Search Authority—European Patent Office—May 16, 2006.

International Preliminary Report on Patentability—PCT/US2005/044814, International Bureau of WIPO, Geneva, Switzerland—Jun. 13, 2007.

3GPP TS 23.246 v6.2.0 (Mar. 2004), "3rd Generation Partnership Project; Technical Specification Group Services and System Aspects; Multimedia Broadcast/Multicast Service (MBMS); Architecture and functional description (Release 6)".

European Search Report—EP11161847—Search Authority—Munich—Jun. 16, 2011.

Kamolphiwong S., et al., "Flow control in ATM networks: a survey", Computer Communications, Elsevier Science Publishers BV, Amsterdam, NL, vol. 21, No. 11, Aug. 10, 1998, pp. 951-968, XP004138768, ISSN: 0140-3664, DOI: 10.1016/S0140-3664(98)00155-8.

\* cited by examiner

| | Message | Function |
|---|---|---|
| 302 | AddFlowRequest() | Sent by CS to BNS to add a content flow |
| 304 | AddFlowResponse() | Sent by BNS to CS with result of AddFlowRequest message |
| 306 | ModifyFlowRequest() | Sent by CS to BNS to modify parameters of a provisioned flow |
| 308 | ModifyFlowResponse() | Sent by BNS to CS with result of ModifyFlowRequest message |
| 310 | RemoveFlowRequest() | Sent by CS to BNS to remove a content flow |
| 312 | RemoveFlowResponse() | Sent by BNS to CS with result of the RemoveFlowRequest message |
| 314 | RegistrationReportRequest() | Sent by CS to BNS to request registration count |
| 316 | RegistrationReportResponse() | Sent by BNS to CS to report number of registrations |
| 318 | StatisticsCheckRequest() | Sent by CS to BNS to check status of a flow |
| 320 | StatisticsCheckResponse() | Sent by BNS to the CS with the result of the StatisticCheckRequest message |
| 322 | LatencyCheckRequest() | Sent by CS to BNS to get an estimatet of the latency to transmit a flow |
| 324 | LatencyCheckResponse() | Sent by BNS to CS to report transmission latency |
| 326 | HeartbeatRequest() | Sent by CS to BNS to monitor link |
| 328 | HeartbeatResponse() | Sent by BNS to CS to confirm link OK |
| 330 | ResetRequest() | Sent by either CS or BNS to reset or resync flow state |
| 332 | ResetResponse() | Sent by either CS or BNS to acknowledge reset or resync of flow state |

FIG. 3

METHODS AND APPARATUS FOR CREATION AND TRANSPORT OF MULTIMEDIA CONTENT FLOWS TO A DISTRIBUTION NETWORK

CROSS-REFERENCE TO RELATED APPLICATIONS

The present application for patent claims priority to Provisional Application No. 60/670,946 entitled "METHODS AND APPARATUS FOR STATE SYNCHRONIZATION IN MEDIA COMMUNICATION" filed Apr. 12, 2005, and assigned to the assignee hereof and hereby expressly incorporated by reference herein and Provisional Application No. 60/634,977 entitled "BCMCS INTERFACE" filed Dec. 9, 2004, and assigned to the assignee hereof and hereby expressly incorporated by reference herein.

The present application for patent is a continuation-in-part of patent application Ser. No. 11/111,050 entitled "METHODS AND APPARATUS FOR CREATION AND TRANSPORT OF MULTIMEDIA CONTENT FLOWS" filed Apr. 20, 2005, now U.S. Pat. No. 7,912,457, which is assigned to the assignee hereof and hereby expressly incorporated by reference herein, which claims priority to U.S. Provisional Patent Application No. 60/564,467 entitled "METHOD AND APPARATUS FOR CREATION OF MULTIMEDIA CONTENT FLOWS AND TRANSPORT OF MULTIMEDIA" filed Apr. 21, 2004.

BACKGROUND

1. Field

The present invention relates generally to transporting multimedia content in a data network, and more particularly, to methods and apparatus for creation and transport of multimedia content flows to a distribution network.

2. Background

Data networks, such as wireless communication networks, have to trade off between services customized for a single terminal and services provided to a large number of terminals. For example, the distribution of content to a large number of mobile terminals (subscribers) is a complicated problem. This is especially true for mobile terminals that communicate using relatively slow speed over-the-air communication links. Therefore, it is very important for content providers to have a way that allows mobile terminals to easily and efficiently receive content and/or other network services.

In current content delivery/media distribution systems, a content provider provides content in the form of audio, video, multimedia, real-time, or non real-time content and other content types to a content provider network that operates to distribute the content to end users. For example, the content provider may provide high quality content, which has corresponding high data rates, to the content provider network. In certain geographic regions, specialized broadcast networks have been developed to receive and distribute this high quality content to selected end users by utilizing special hardware and/or communication links. In some cases, the specialized broadcast network may provide ten or more high bandwidth channels with which to distribute the content.

Unfortunately, these specialized networks are generally expensive and are provided over only limited operating regions. Over wide operating areas access networks typically provide users with much less bandwidth at a much lower cost. For example, a typical wireless network may provide only one data channel with which to deliver multimedia content. Typically, this data channel provides only point-to-point communications so that it is expensive and inefficient to deliver content to a large number of wireless users. Additionally, the bandwidth available on the data channel may be much less than the bandwidth available over the specialized broadcast network. As a result, there currently exists no cost effective and efficient way to deliver high quality content to a large number of users on a access network.

Therefore, what is needed is a system to create and transport multimedia content flows across data networks. For example, the system should operate to create and transport multimedia content flows from a content provider's network to a broadcast distribution network. The system should also provide a mechanism to adjust one or more parameters of a content flow so that it may be broadcast over the distribution network.

SUMMARY

In one or more embodiments, a transport system, comprising methods and apparatus, is provided that operates to create and transport multimedia content flows to a distribution network. For example, in one embodiment, the transport system operates to transport content flows from a content network to an access network. By allowing content to be transported to an access network, the content may be broadcast to devices on the access network using the available bandwidth. Devices that are authorized to receive the content can store the received broadcast in a cache for later viewing.

In one embodiment, a method is provided for transporting a content flow to an access network for distribution to devices coupled to the access network. The method comprises transmitting a request message to add the content flow to the access network, wherein the request message comprises one or more flow parameters associated with the content flow. The method also comprises receiving a response message indicating that the content flow associated with the one or more flow parameters will be added to the access network, and delivering the content flow to the access network.

In one embodiment, a method is provided for transporting a content flow to an access network for distribution to devices coupled to the access network. The method comprises transmitting a request message to add the content flow to the access network, wherein the request message comprises one or more flow parameters associated with the content flow. The method also comprises receiving the response message indicating that the content flow will not be added to the access network, and adjusting selected flow parameters associated with the content flow to produce updated flow parameters. The method also comprises transmitting a new request message to add the content flow to the access network, wherein the new request message comprises the updated flow parameters, and receiving a new response message indicating that the content flow associated with the updated flow parameters will be added to the access network.

In one embodiment, a method is provided for transporting a content flow to an access network for distribution to devices coupled to the access network. The method comprises transmitting a heartbeat request message, and receiving a heartbeat response message that indicates a communication link is operational. The method also comprises transmitting a request message to add the content flow to the access network, wherein the request message comprises one or more flow parameters associated with the content flow, and receiving a response message indicating that the content flow associated with the one or more flow parameters will be added to the access network.

In one embodiment, apparatus is provided for transporting a content flow to an access network for distribution to devices coupled to the access network. The apparatus comprises logic for transmitting a request message to add the content flow to the access network, wherein the request message comprises one or more flow parameters associated with the content flow, and logic for receiving the response message indicating that the content flow will not be added to the access network. The apparatus also comprises logic for adjusting selected flow parameters associated with the content flow to produce updated flow parameters, and logic for transmitting a new request message to add the content flow to the access network, wherein the new request message comprises the updated flow parameters. The apparatus also comprises logic for receiving a new response message indicating that the content flow associated with the updated flow parameters will be added to the access network.

In one embodiment, a computer-readable media is provided that comprises instructions, which when executed by processing logic, operate to transport a content flow to an access network for distribution to devices coupled to the access network. The computer-readable media comprises instructions for transmitting a request message to add the content flow to the access network, wherein the request message comprises one or more flow parameters associated with the content flow, and instructions for receiving the response message indicating that the content flow will not be added to the access network. The computer-readable media also comprises instructions for adjusting selected flow parameters associated with the content flow to produce updated flow parameters, instructions for transmitting a new request message to add the content flow to the access network, wherein the new request message comprises the updated flow parameters, and instructions for receiving a new response message indicating that the content flow associated with the updated flow parameters will be added to the access network.

In one embodiment, a method is provided for transporting a content flow to an access network for distribution to devices coupled to the access network. The method comprises receiving a request message to add the content flow to the access network, wherein the request message comprises one or more flow parameters associated with the content flow, and determining that the content flow will be added to the access network based on the one or more flow parameters. The method also comprises transmitting a response message indicating that the content flow associated with the one or more flow parameters will be added to the access network, and receiving the content flow.

In one embodiment, a method is provided for transporting a content flow to an access network for distribution to devices coupled to the access network. The method comprises receiving a request message to add the content flow to the access network, wherein the request message comprises one or more flow parameters associated with the content flow, and determining that the content flow will not be added to the access network based on the one or more flow parameters. The method also comprises transmitting a response message indicating that the content flow will not be added to the access network, receiving a new request message to add the content flow to the access network, wherein the new request message comprises updated flow parameters, and transmitting a new response message indicating that the content flow associated with the updated flow parameters will be added to the access network.

In one embodiment, apparatus is provided for transporting a content flow to an access network for distribution to devices coupled to the access network. The apparatus comprises logic configured to receive a request message to add the content flow to the access network, wherein the request message comprises one or more flow parameters associated with the content flow, and logic configured to determine that the content flow will be added to the access network based on the one or more flow parameters. The apparatus also comprises logic configured to transmit a response message indicating that the content flow associated with the one or more flow parameters will be added to the access network, and logic configured to receive the content flow.

In one embodiment, apparatus is provided for transporting a content flow to an access network for distribution to devices coupled to the access network. The apparatus comprises logic configured to receive a request message to add the content flow to the access network, wherein the request message comprises one or more flow parameters associated with the content flow, and logic configured to determine that the content flow will be added to the access network based on the one or more flow parameters. The apparatus also comprises logic configured to transmit a response message indicating that the content flow associated with the one or more flow parameters will be added to the access network, and logic configured to receive the content flow.

In one embodiment, a computer-readable media is provided that comprises instructions, which when executed by processing logic, operate to transport a content flow to an access network for distribution to devices coupled to the access network. The computer-readable media comprises instructions for receiving a request message to add the content flow to the access network, wherein the request message comprises one or more flow parameters associated with the content flow, and instructions for determining that the content flow will be added to the access network based on the one or more flow parameters. The computer-readable media also comprises instructions for transmitting a response message indicating that the content flow associated with the one or more flow parameters will be added to the access network and instructions for receiving the content flow.

Other aspects, advantages, and features of the present invention will become apparent after review of the hereinafter set forth Brief Description of the Drawings, Description, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein:

FIG. 3 shows one embodiment of transport messages for use in embodiments of a transport system;

DESCRIPTION

In one or more embodiments, a transport system is provided for the creation and transport of multimedia content flows to a distribution network.

Figure 1:
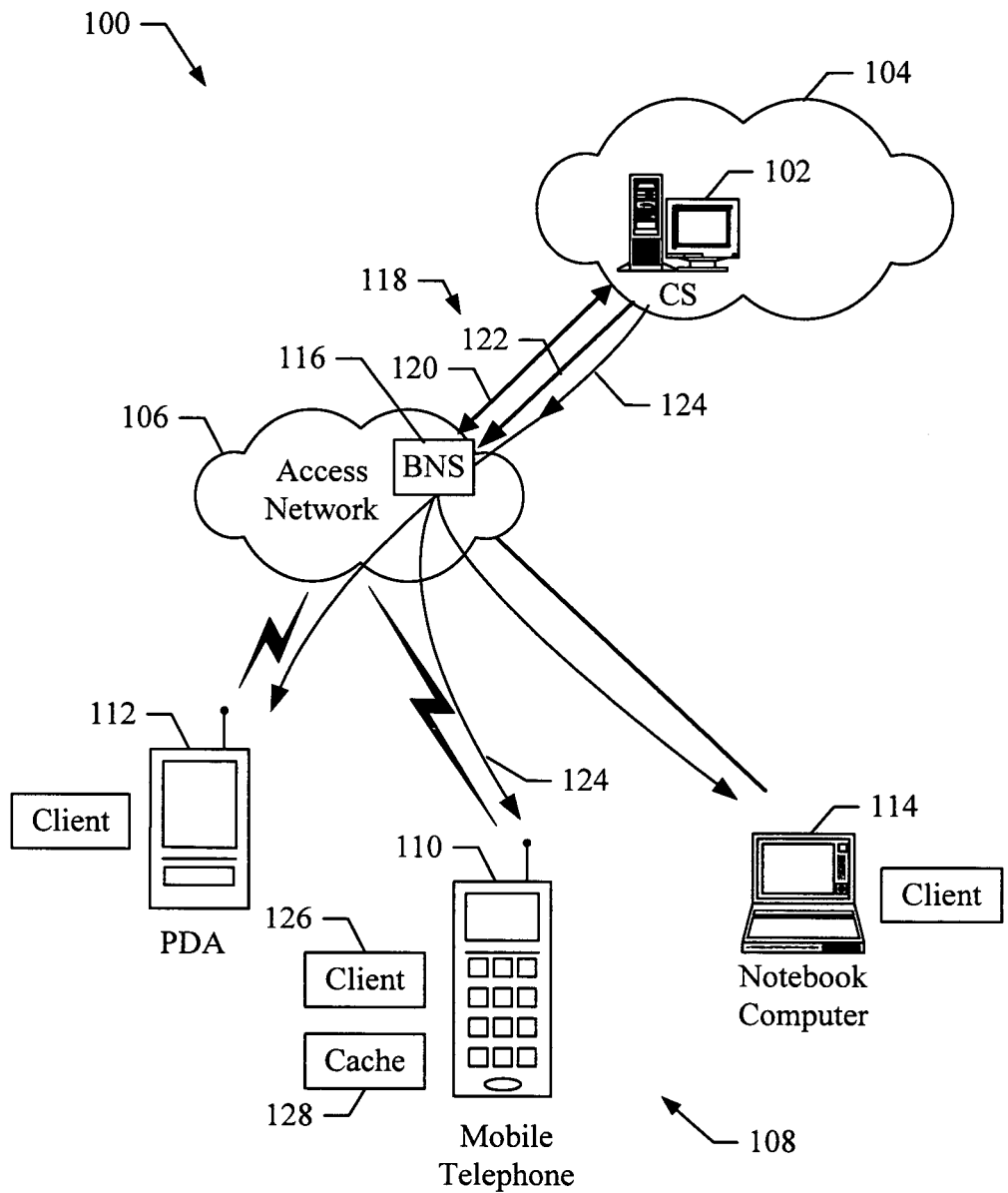
FIG. 1 shows one embodiment of a communication network that comprises one embodiment of a system that operates to create and transport multimedia content flows to a broadcast distribution network.

FIG. 1 shows one embodiment of a communication network 100 that comprises one embodiment of a transport system that operates to create and transport multimedia content flows to a broadcast distribution network. For example, the transport system is suitable for use in transporting content from a content network to an access network for broadcast distribution.

The network 100 comprises a content server 102, a content network 104, and an access network 106. The network 100 also includes devices 108 that comprise a mobile telephone 110, a personal digital assistance (PDA) 112, and a notebook computer 114. The devices 108 illustrate just some of the devices that are suitable for use in one or more embodiments of the transport system. It should be noted that although three devices are shown in FIG. 1, virtually any number of devices, or types of devices, are suitable for use in the transport system. It should also be noted that the device 110 and 112 communicate with the access network 106 through wireless communication links, and that the computer 114 communicates with the access network 106 through a hardwired connection.

The content network 104 operates to provide content for distribution. The content comprises video, audio, multimedia content, clips, real-time and non real-time content, scripts, programs, data or any other type of suitable content. The content network 104 comprises any combination of wired and wireless networks that operate to provide the content. It should also be noted that in various embodiments of the transport system, any other entities, such as a content provider, content retailer, content access entity, or any other entity may provide content for distribution over the access network 106.

In one or more embodiments, the transport system operates to deliver content from the content network 104 for distribution over the access network 106. In one embodiment, the content server (CS) 102 at the content network 104 operates to communicate with a broadcast network server (BNS) 116 at the access network 106. The CS 102 and the BNS 116 communicate using one or more embodiments of a transport interface 118 that allows the content network 104 to deliver content in the form of content flows to the access network 106 for broadcast/multicast to the devices. The transport interface 118 comprises a control interface 120 and a bearer channel 122. The control interface 120 operates to allow the CS 102 to add, change, cancel, or otherwise modify contents flows that are transmitted to the access network 106. The bearer channel 122 operates to transport the content flows from the content network 104 to the access network 106.

In one embodiment, the CS 102 uses the transport interface 118 to schedule a content flow to be transmitted to the BNS 116 for broadcast/multicast over the access network 106. For example, the content flow 124 may comprise a non real time content clip. In one embodiment, the CS 102 operates to negotiate with the BNS 116 to determine one or more parameters associated with the content flow 124. For example, the data rate or other characteristic of the content clip is negotiated so that the content clip may be broadcast over the access network 106. Once the BNS 116 receives the content flow 124, it broadcasts/multicasts the content flow 124 over the access network 106 for reception by one or more of the devices 108. Any of the devices 108 may be authorized to receive the content contained in the flow 124 and cache it for later viewing by the device user.

For example the device 110 comprises a client program 126 that operates to provide a program guide that displays a listing of content that is scheduled for broadcast over the access network 106. The device user may then select to receive any particular content for rendering in real time or to be stored in a cache 128 for later viewing. For example the content clip may be scheduled for broadcast during the evening hours, and the device 110 operates to receive the broadcast and cache the content clip in the cache 128 so that the device user may view the clip the next day. Typically, the content is broadcast as part of a subscription service and the receiving device may need to provide a key or otherwise authenticate itself to receive the broadcast.

In one or more embodiments, the transport system allows the CS 102 to add, change, modify, or delete flows that are provided over the bearer channel 122 to the BNS 116. In another embodiment, the transport system allows the CS 102 to obtain statistical information about any content flow provided to the access network 106. As a result, the transport system operates to allow scheduled content flows to be transmitted from the content network 104 to the access network 106 for broadcast to the devices 108. The system also provides a way for statistical information pertaining to the content flows at the access network 106 to be returned to the CS 102.

Figure 2:
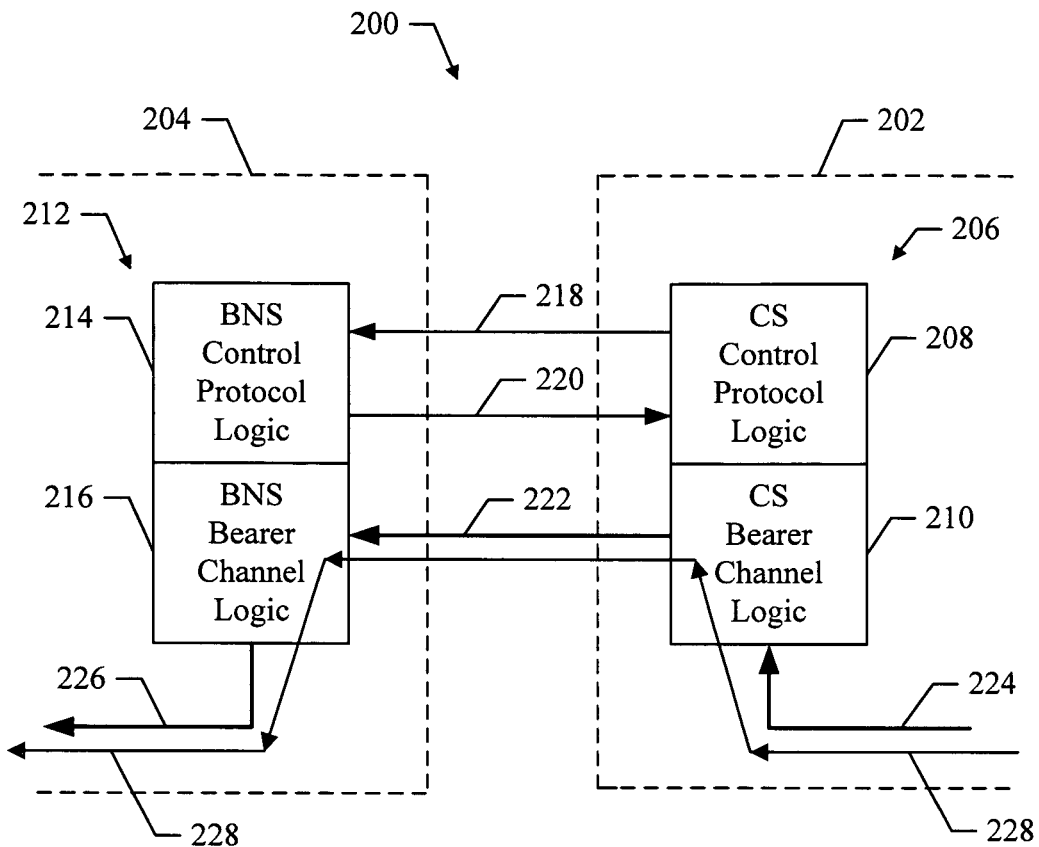
FIG. 2 shows a diagram of one embodiment of a transport system that operates to create and transport multimedia content flows to a distribution network.

FIG. 2 shows a diagram of one embodiment of a transport system 200 that operates to create and transport multimedia content flows to a distribution network. For example, the system 200 may be used as the transport system described in FIG. 1.

One embodiment of the transport system 200 allows a content network 202 to transport content flows to an access network 204. The content network 202 includes a CS 206 that comprises CS control protocol logic 208 and CS bearer channel logic 210. The access network 204 includes a BNS 212 that comprises BNS control protocol logic 214 and BNS bearer channel logic 216.

The CS control protocol logic 208 communicates with the BNS control protocol logic 214 via a control interface that comprises a request channel 218 and a response channel 220. The request channel 218 allows the CS control protocol logic 208 to send request messages to the BNS control protocol logic 214 that requests to add, change, delete or otherwise modify content flows, or request statistical information. The response channel 220 allows the BNS protocol logic 214 to send response messages to the CS control protocol logic 208 that respond to any of the request messages. In one embodiment, the request channel 218 and the response channel 220 are comprised of any suitable type of communication links and the CS control protocol logic 208 and the BNS control protocol logic 214 comprises any suitable transmitting and receiving logic to allow messages to be exchanged using the request channel 218 and the response channel 220.

The CS bearer channel logic 210 operates to transmit content flows from the content network 202 to the access network 204 under the control of the CS control protocol logic 208. For example, the CS bearer channel logic 210 receives a content flow 228 at its input 224 from the content network 202. After the CS control protocol logic 208 gets authorization to add the content flow 228 to the access network 204, the CS bearer channel logic 210 operates to transmit the content flow 228 over the bearer channel 222 to the BNS bearer channel logic 216, which in turn broadcasts the content flow 228 over its output channel 226 to devices coupled to the access network 204.

In one embodiment, the bearer channel 222 utilizes a generic routing encapsulation (GRE) protocol to transmit flows from the CS 206 to the BNS 212, however any other transmission technology or protocol may be used. For example, the CS bearer protocol logic 210 and the BNS bearer protocol logic 216 comprise any suitable logic to implement the bearer channel 222 using the GRE protocol. However, in other embodiments, the bearer channel 222 may utilize any suitable transmission protocol.

In one embodiment, the CS 206 and BNS 212 comprise a CPU, processor, gate array, hardware logic, memory elements, virtual machine, software, and/or any combination of hardware and software. Thus, the CS 206 and BNS 212 generally comprise logic to execute machine-readable instructions to perform the functions described herein. It should be noted that the CS 206 and the BNS 212 shown in FIG. 2 represent just one implementation and that other implementations are possible within the scope of the embodiments.

In one embodiment, the transport system comprises program instructions stored on a computer-readable media, which when executed by at least one processor, for instance, a processor located at the CS 206 or the BNS 212, operate to provide the functions of the transport system described herein. For example, instructions may be loaded into the CS 206 and/or the BNS 212 from a computer-readable media, such as a floppy disk, CDROM, memory card, FLASH memory device, RAM, ROM, or any other type of memory device or computer-readable media. In another embodiment, the instructions may be downloaded into the CS 206 and/or the BNS 212 from an external device or network resource that interfaces to the CS 206 or the BNS 212. The instructions, when executed by the processing logic at the CS 206 or the BNS 212, provide one or more embodiments of a transport system as described herein.

FIG. 3 shows one embodiment of transport messages 300 for use in embodiments of a transport system. For example, the transport messages 300 may be used in the transport system 200 shown in FIG. 2. In one or more embodiments, the transport messages 300 are transmitted between the CS control protocol logic 208 and the BNS control protocol logic 214 (i.e., via links 218, 220) to allow the CS control protocol logic 208 to add, change, or delete content flows provided to the access network 204. In another embodiment, the transport messages 300 allow the CS 206 to obtain statistical information about flows in the access network 204.

In one embodiment, one or more of the transport messages 300 comprise parameters that are associated with any particular flow. For example, the AddFlowRequest message 302 comprises one or more parameters to indicate a flow identifier, proposed delivery time, rate, proposed quality of service (QoS), start time, end time, or any other parameter associated with the referenced flow. Any of the messages 300 may be used to convey one or more message parameters to allow information to pass between the CS control protocol logic 208 and the BNS control protocol logic 214. It should be noted that the transport messages 300 illustrate just one implementation and that other messages and message types are possible for use within the scope of the embodiments.

The transport messages 300 comprise messages 302 through 312 that operate to add, modify, and remove a flow from the access network 204. For example, the message 302 contains flow parameters and operates to request that a content flow be added to the access network. The message 306 operates to modify a particular content flow that is identified in the message, for example, by modifying its start or end time. The message 310 operates to remove a particular content flow identified in the message, which may be either a flow scheduled for delivery or a flow currently being delivered.

The messages 314 through 324 operate to obtain registration, statistics, and latency information about flows in the access network 204 that are identified in the respective message. For example, the message 314 operates to request a determination of how many devices are registered to receive a particular content flow identified in the message. The message 316 operates to provide a report that indicates the number of registered devices. The message 318 operates to request any type of statistics about a flow identified in the message, and the message 322 operates to request a latency time about a flow identified in the message.

The messages 326 through 332 operate to provide a heartbeat mechanism and to provide a reset/re-sync mechanism. The heartbeat mechanism operates to indicate that the communication link between a CS and BNS is operational. The reset/re-sync mechanism operates to allow either a CS or BNS to reset/re-sync the state of flows in the transport system. A more detailed description of the messages 326 through 332 is provided in another section of this document.

Thus, in one or more embodiments, the messages 300 operates to process content flows transmitted from the content network 202 to the access network 204, and also to allow status information about those flows to be returned from the access network 204 to the content network 202.

Figure 4:
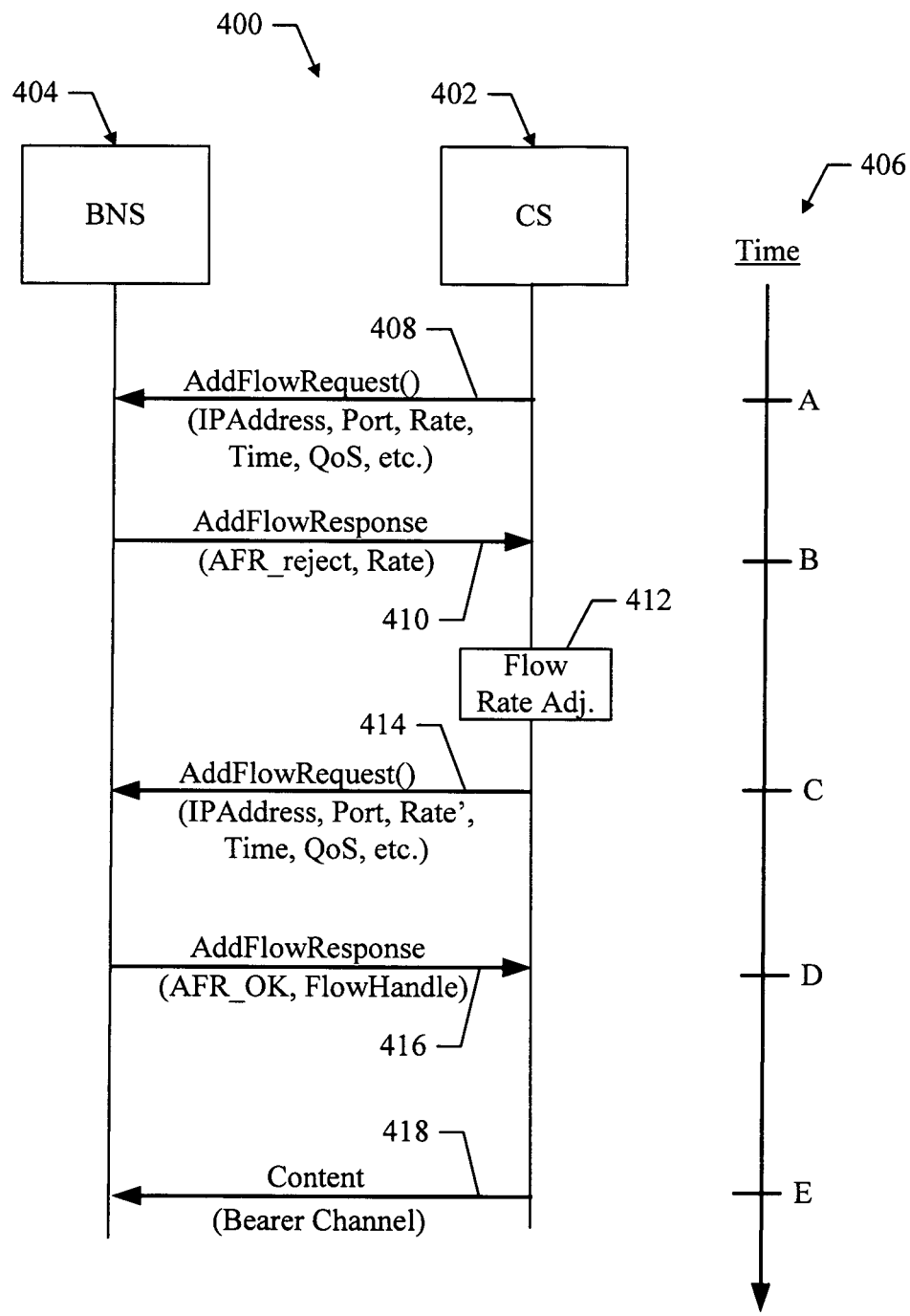
FIG. 4 shows one embodiment of a messaging protocol for use in embodiments of a transport system.

FIG. 4 shows one embodiment of a messaging protocol 400 for use embodiments of a transport system. For example the messaging protocol 400 may be used to transmit the messages 300 between a CS 402 and a BNS 404. A time indicator 406 is provided which indicates a relative time for each message.

At time A, an add flow request message 302 is transmitted, as shown at 408, from the CS 402 to the BNS 404. The add flow request message transmitted at 408 is a request to add a flow to the access network, and the request includes flow parameters such as a flow address (IP Address), a flow port (Port), a flow rate (Rate), a scheduled delivery time (Time), QoS level, and/or any other suitable flow parameters that may be used to describe the flow that the CS 402 would like to add to the access network.

At time B, which may be a relatively short time after time A, the BNS 404 responds with an add flow response message 304, as shown at 410, that indicates that the requested addition of the flow is rejected because the requested rate cannot be supported.

As a result of the rejected add flow request, the CS 402 operates (at 412) to adjust the rate of the flow (i.e., Rate') so that the flow may be accepted by the BNS 404 for distribution by the access network.

At time C, a new AddFlowRequest message 302 is transmitted, as shown at 414, from the CS 402 to the BNS 404. The add flow request message transmitted at 414 is a request to add the updated flow to the access network, and the request includes new flow parameters (i.e., Rate').

At time D, which may be a relatively short time after time C, the BNS 404 responds with an add flow response message 304, as shown at 416, that indicates that the requested addition of the flow with the updated parameters is accepted The response message at 416 includes a flow handle that identifies the flow.

At time E, which corresponds to the time parameter (Time) indicated in the add flow request 302, the content flow is transmitted from the CS 402 to the BNS 404 through the bearer channel as shown at 418. For example, the bearer channel may be the bearer channel 222 shown in FIG. 2. Thus, in one or more embodiments, the messaging protocol 400 may be used to exchange one or more of the transport messages 300 between the CS 402 and the BNS 404 to allow a flow to be added, modified, deleted, or to allow statistics to be obtained.

Figure 5:
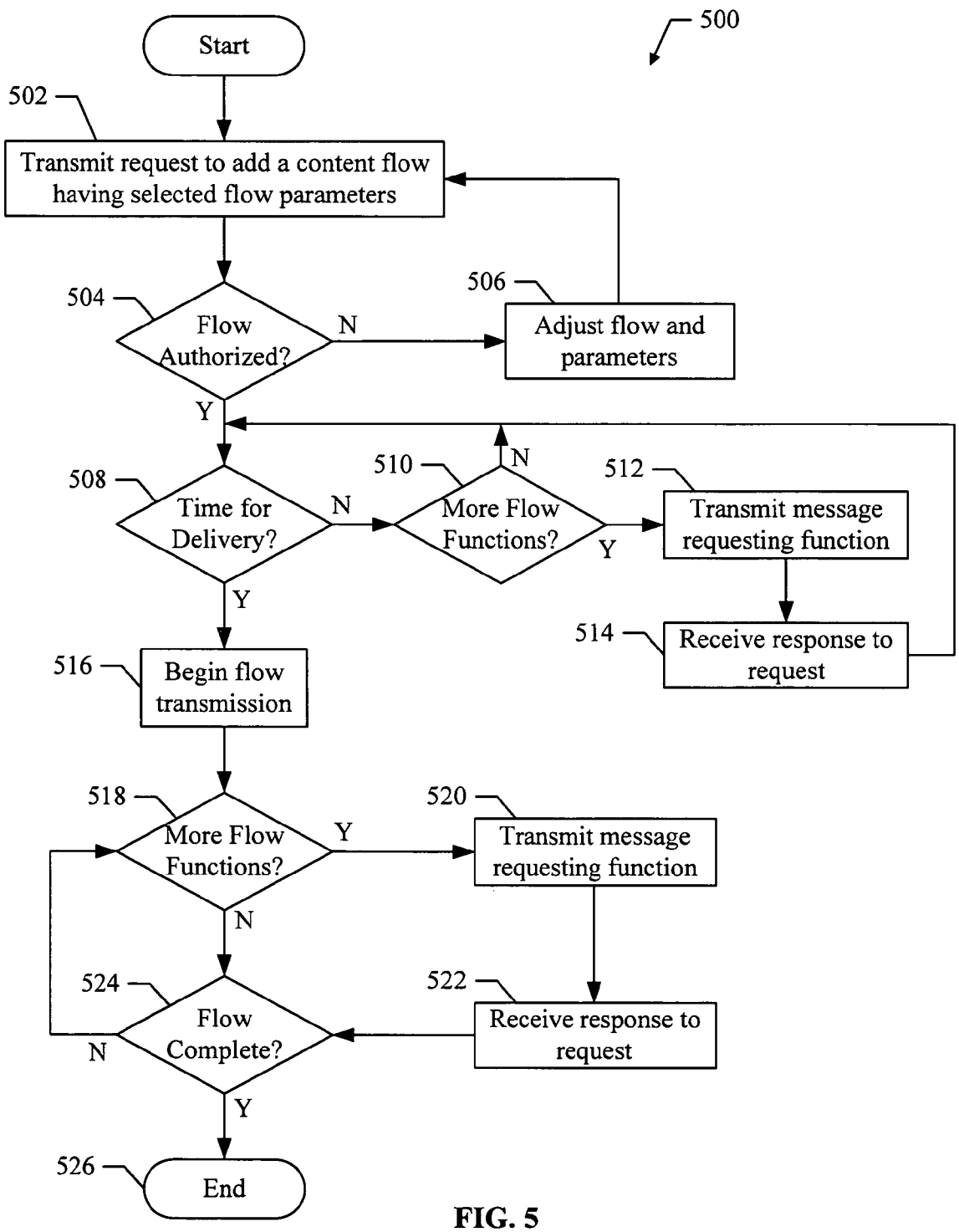
FIG. 5 shows one embodiment of a method for operating a content server in embodiments of a transport system.

FIG. 5 shows one embodiment of a method 500 for operating a content server in embodiments of a transport system. For clarity, the method 500 will be described with reference to the CS 206 shown in FIG. 2. In one or more embodiments, the CS control protocol logic 208 executes program instructions and controls the operation of the server CS 206 to perform the functions described below.

At block 502, a request is transmitted that requests to add a content flow to an access network. For example the request is an AddFlowRequest message 302 transmitted to a BNS associated with the access network. The request includes flow parameters that describe the flow (i.e., rate, QoS, etc.) and indicates a scheduled time that the flow is to be added to the access network. For example, the CS control protocol logic 208 transmits the request over the request channel 218 to the BNS control protocol logic 214.

At block 504, a response is received that indicates whether or not the flow will be added to the access network. For example, the response is an AddFlowResponse message 304 received by the CS control protocol logic 208. In one embodiment, the access network determines if the flow can be broadcast given the stated flow parameters. For example, if the flow parameters indicate a very high data rate, the access network may not be able to broadcast the flow. Similarly, the flow parameters may indicate any other criteria that may not be supported by the access network, (i.e., scheduled time, QoS, etc.). If the request is granted, the method proceeds to block 508.

If the request is not granted, the response message may also provide one or more acceptable parameters. For example, the AddFlowResponse message 304 indicates that the flow will not be added to the access network, however, in one embodiment, the response message comprises one or more acceptable parameters that may be used to obtain flow acceptance. For example, an acceptable rate or QoS parameter may be provided in the response message. The method proceeds to block 506.

At block 506, the flow and/or its associated parameters are adjusted so that it may be transmitted on the access network. For example, the flow rate, QoS, scheduled transmission time, or any other parameter of the flow may be adjusted so that the flow may be broadcast by the access network. For example, the flow data rate may be adjusted to a data rate that can be supported by the access network. In one embodiment, the CS control protocol logic 208 operates to adjust the flow and/or flow parameters based on acceptable parameters provided in the response message. The method then proceeds to block 502 where a new AddFlowRequest message 302 is transmitted and includes the new or adjusted flow parameters.

It should be noted that the blocks 502, 504, and 506 operate to allow the CS to negotiate one or more parameters associated with the flow. For example, if the access network refuses to accept the flow at a given rate, the CS may adjust the rate at block 506 based on acceptable parameters in the response message, and a new request to add the flow at the new rate is transmitted at block 502. Thus, any of the parameters associated with the flow, such as the scheduled transmission time, data rate, QoS parameters, start time, or end time may be negotiated until parameters are determined that are acceptable to the access network.

At block 508, assuming the add flow request is successful, a test is performed to determine if it is time to deliver the flow to the access network. For example, the CS control protocol logic 208 operates to determine if the scheduled time for flow transmission has occurred. If the schedule time for flow transmission has occurred, the method proceeds to block 516. If the scheduled time for flow transmission has not occurred, the method proceeds to block 510.

At block 510, a test is performed to determine if any flow functions need to be performed. For example, the flow start or end time may need to be adjusted, or the flow may be deleted. In one embodiment, the CS control protocol logic 208 operates to determine if another flow function needs to be performed. If there are no flow functions that need to be performed, then the method proceeds to block 508 to determine if it is time to delivery the flow. If a flow function needs to be performed, then the method proceeds to block 512.

At block 512, a message is transmitted requesting a flow function be performed. For example, the message may request that the flow start or end times be adjusted, or that a flow be deleted. For example, the message may be one of the messages 300 shown in FIG. 3. In one embodiment, the CS control protocol logic 208 operates to transmit the message to the BNS control protocol logic 214 via the request channel 218.

At block 514, a response message is received indicating whether or not the function is authorized or otherwise providing a response to the function. For example, the response message may indicate that a requested change in start time for the flow is authorized. Alternatively, the response message may provide information that has been requested. For example, the response message may indicate a registration value as provided by the RegistrationReportResponse message 316. In one embodiment, the response message is receive by the CS control protocol logic 208 through the response channel 220. The method then proceeds to block 508 to determine if it is time to delivery the flow.

At block 516, a transmission of the content flow to the access network at the scheduled time is started. For example, in one embodiment, the content flow is transmitted from the CS bearer channel logic 210 over the bearer channel 222 to the BNS bearer channel logic 216.

At block 518, a test is performed to determine if more flow functions need to be performed. For example, the CS control protocol logic 208 determines if more flow functions need to be performed. For example, the flow functions include changing the flow end time, deleting the flow, or any other function. If no more flow functions are to be performed, the method proceeds to block 524. If more flow functions need to be performed, the method proceeds to block 520.

At block 520, a message is transmitted requesting a flow function be performed. For example, the message may request that the flow end time be adjusted, or that a flow be deleted. For example, the message may be one of the messages 300 shown in FIG. 3. In one embodiment, the CS control protocol logic 208 operates to transmit the message to the BNS control protocol logic 214 through the request channel 218.

At block 522, a response message is received indicating whether or not the function is authorized or otherwise provide a response to the function. For example, the response message may indicate that a requested change in the end time for the flow is authorized. Alternatively, the response message may provide information that has been requested, such as a registration value as provided by message 300 of FIG. 3. In one embodiment, the response message is receive by the CS control protocol logic 208 via the response channel 220.

At block 524, a test is performed to determine if the transmission of the flow has completed. For example, the CS control protocol logic 208 determines if the transmission has been completed. If the transmission has not completed, the method proceeds to block 518 to determine if more flow functions need to be performed. If the transmission has completed, the method ends at block 526.

It should be noted that the method 500 illustrates just one implementation and that changes, additions, deletions, or rearrangements of the described functions may be made without deviating from the scope of the described embodiments.

Figure 6:
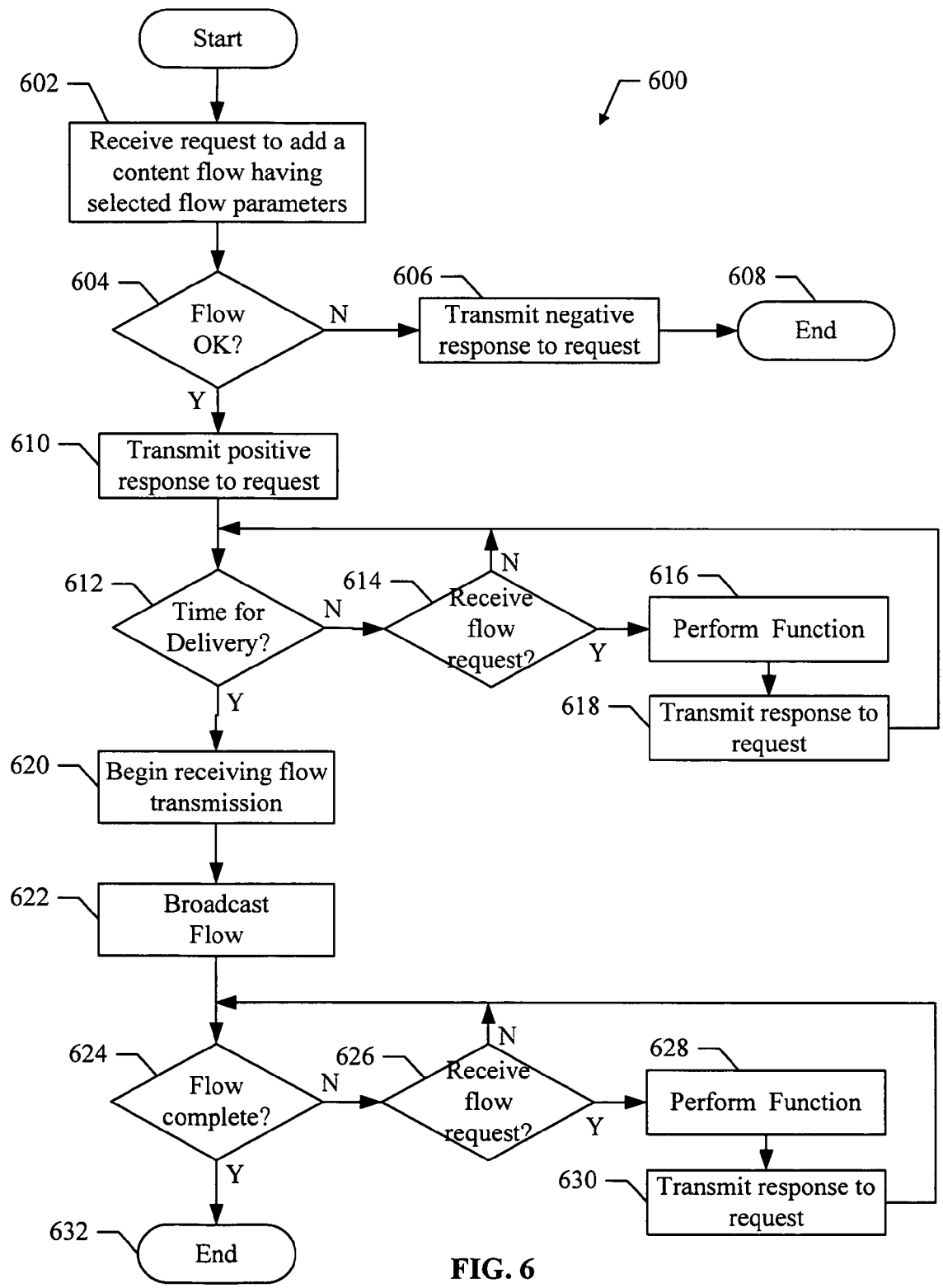
FIG. 6 shows one embodiment of a method for operating a broadcast server in embodiments of a transport system.

FIG. 6 shows one embodiment of a method 600 for operating a broadcast server in embodiments of a transport system. For clarity, the method 600 will be described with reference to the BNS 212 shown in FIG. 2. In one or more embodiments, the BNS control protocol logic 214 executes program instructions and controls the operation of the BNS 212 to perform the functions described below.

At block 602, a request is received to add a content flow for broadcast over an access network associated with the broadcast server. For example, the request is an AddFlowRequest message 302 received by the BNS control protocol logic 214, and the request includes flow parameters associated with the flow that may include a rate, QoS, scheduled delivery time, etc.

At block 604, a determination is made whether or not the flow will be accepted given the stated flow parameters. For example, the BNS control protocol logic 214 operates to determine if the proposed rate or QoS of the flow is acceptable. If the propose flow and/or its parameters are acceptable, the method proceeds to block 610. If the proposed flow and/or its parameters are not acceptable, the method proceeds to block 606.

At block 606, a negative response is transmitted in response to the add flow request. For example, the BNS control protocol logic 214 operates to transmit the negative response message to the CS control protocol logic 208 via the response channel 220. In one embodiment, the negative response message is the AddFlowResponse message 304 shown in FIG. 3, which is set to include a parameter to indicate a negative response, and may also comprise one or more acceptable parameters. For example, the BNS control protocol logic 214 may determine acceptable parameters that would allow the flow to be broadcast on the access network. These parameters are included in the response message so that a requesting device is provided with an indication of what parameters need to be adjusted to allow the flow to be added to the access network. The method then ends at block 608.

At block 610, a positive response is transmitted that authorizes the content flow to be added to the access network. For example, the BNS control protocol logic 214 transmits a positive response message that authorizes the content flow to be added to the access network. In one embodiment, the response message is the AddFlowResponse message 304 that includes parameters indicating the positive response and transmitted to the CS control protocol logic 208 using the response channel 220. The response message includes a flow handle that identifies the flow in the access network.

It should be noted that the blocks 602, 604, 606, and 610 operate to allow parameters associated with the flow to be negotiated between the CS and the BNS. Fore example, if the BNS 212 rejects a flow and transmits a negative response at block 606, the CS 206 may adjust the flow parameters and transmit a new add flow request that is receive at block 602. If the new flow parameters are acceptable, the BNS 212 accepts the flow and transmits a positive response at block 610. Thus, the BNS 212 and the CS 206 may operate to negotiate any flow parameter associated with the flow.

At block 612, a determination is made to determine whether or not it is time to for the scheduled flow to be received. For example, the BNS control protocol logic 214 waits for the scheduled transmission time provided in the add flow request message received at block 602. If it is time for the flow to be received, the method proceeds to block 620. If it is not time to receive the flow, the method proceeds to block 614.

At block 614, a determination is made to determine if any more flow requests have been received. For example, the BNS control protocol logic 214 operates to receive any additional flow requests from the CS control protocol logic 208, via the request channel 218. The flow requests may request to modify or delete a flow in the wireless network, or obtain status about a particular flow. If no requests are received, the method proceeds to block 612 to determine if it is time to receive the flow. If additional flow requests are received, the method proceeds to block 616.

At block 616, the received flow request is decoded and if necessary, any identified functions are performed. For example, the request is decoded to determine what flow function is to be performed. The flow function may be one of the functions described with reference to the messages 300 in FIG. 3, or any other suitable function. For example, the BNS control protocol logic 214 operates to decode the flow request, and the requested function is provided if necessary. For example, the requested function may be a statistics request (message 318) regarding a particular flow in the access network. The BNS control protocol logic 214 operates to obtain the statistics and provide the statistics information to the requesting device in a response message (message 320). For example the requesting device may be the CS control protocol logic 208 and the BNS control protocol logic 214 operates to perform the requested function.

At block 618, a response is transmitted in response to the flow request. For example, the BNS control protocol logic 214 operates to assemble a response message and transmit it to the requesting device via the response channel 220. For example, the request may be a request to determine how many devices in the access network are registered to receive the flow, as provided by the message 314. The BNS control protocol logic 214 operates to determine the number of registered devices and return this value in the response message 316. The method then proceeds to block 612 to determine if it is time to receive the transmitted flow.

At block 620, the BNS begins receiving the flow at the scheduled time. For example, the content flow is received over the bearer channel 222 by the BNS bearer channel logic 216.

At block 622, the content flow is broadcast over the access network. For example, the BNS bearer channel logic 216 operates to broadcast the received content flow over the access network for reception by one or more devices. The devices may cache the content flow for later viewing. In another embodiment, the flow may be cached by the BNS for later broadcast to the devices in the access network.

At block 624, a determination is made whether or not the flow has been completely received. For example, the BNS control protocol logic 214 operates to determine if the flow has been completely received. If the flow has not been completely received, the method proceeds to block 626. If the flow has been completely received, the method ends at block 632.

At block 626, a determination is made to determine if any more flow requests have been received. For example, the BNS control protocol logic 214 operates to receive any additional flow requests from the CS control protocol logic 208 via the request channel 218. The flow requests may request to modify or delete a flow from the access network, or obtain status about a particular flow. If no requests are received, the method proceeds to block 624 to determine if the flow has been completely received. If additional flow requests are received, the method proceeds to block 628.

At block 628, the received flow request is decoded and if necessary, any identified functions are performed. For example, the request is decoded to determine what flow function is to be performed. The flow function may be one of the functions described with reference to the messages 300 in FIG. 3, or any other suitable function. For example, the BNS control protocol logic 214 operates to decode the flow request, and the requested function is provided if necessary. For example, the requested function may be a statistics request regarding a particular flow in the access network. The BNS control protocol logic 214 operates to obtain the statistics and provide the statistics information to the requesting device in the message 320. For example the requesting device may be the CS control protocol logic 208 and the BNS control protocol logic 214 operates to perform the requested function.

At block 630, a response is transmitted in response to the flow request. For example, the BNS control protocol logic 214 operates to assemble a response message and transmit it to the requesting device via the response channel 220. For example, the request may be a request to determine how many devices in the access network are registered to receive the flow, as provided by the message 314. The BNS control protocol logic 214 operates to determine the number of registered devices and return this value in the response message 316. The method then proceeds to block 624 to determine if the flow has been completely received. When the flow has been completely received, the method ends at block 632.

It should be noted that the method 600 illustrates just one implementation and that changes, additions, deletions, or rearrangements of the described functions may be made without deviating from the scope of the described embodiments.

Heartbeat Mechanism

Referring again to FIGS. 2 and 3, in one or more embodiments, a heartbeat mechanism is provided that monitors the health of the communication link between the CS 206 and the BNS 212. In one embodiment, the CS control protocol logic 208 periodically sends a HeartbeatRequest message 326 to the BNS control protocol logic 214. For example, the HeartbeatRequest message 326 is transmitted every 60 seconds over the request channel 218. The BNS control protocol logic 214 responds with a HeartbeatResponse message 328 over the response channel 220 within a selectable response time. The successful exchange of heartbeat messages indicates that the communication link between the CS 206 and the BNS 212 is operating properly. In one embodiment, the HeartbeatRequest message 326 and the HeartbeatResponse message 328 may comprise one or more messages having any suitable format and/or information parameters to allow the health of the communication link between the CS 206 and the BNS 212 to be monitored.

In one embodiment, the transport system operates to detect the health of the communication link between the CS 206 and the BNS 212 based on three scenarios. In the first scenario, the HeartbeatRequest and HeartbeatResponse messages are successfully exchanged. In a second scenario, HeartbeatRequest messages transmitted from the CS 206 go unanswered due to the fact that HeartbeatResponse messages from the BNS 212 have been lost. After several repeated transmissions of the HeartbeatRequest message go unanswered, the CS 206 determines that the communication link has failed. In a third scenario, repeated transmission of the HeartbeatRequest message fails to reach the BNS 212 due to some type of communication link failure. After several repeated transmissions of the HeartbeatRequest message go unanswered, the CS 206 determines that the communication link has failed. Thus, the heartbeat mechanism provides a way to monitor the health of the communication link between the CS 206 and the BNS 212.

State Synchronization Mechanism

In one or more embodiments, a state synchronization mechanism is provided that allows flow state information at both the CS 206 and the BNS 212 to be reset and/or synchronized. In one or more embodiments, state synchronization is achieved through the use of the ResetRequest 330 and ResetResponse 332 messages.

The ResetRequest message 330 may be transmitted from either the CS 206 or the BNS 212 and contains zero or more flow handles that indicate that the transmitter of the ResetRequest message has state information for zero or more flows, respectively. Upon receipt of the ResetRequest message, the receiver (either CS 206 or BNS 212) compares the received list of flow handles with it own list and removes state for any flow handles that are not included within the received list.

The receiver of the ResetRequest message (either CS 206 or BNS 212) acknowledges the receipt of the message by transmitting a ResetResponse message 332 that includes a list of its active flow handles. Upon receipt of the ResetResponse message 332, the receiver of that message compares the received list of flow handles with its own list and removes state for any flow handles that are not included within the received list. As a result of the ResetRequest/ResetResponse transaction, the CS 206 and the BNS 212 have the same state information for the same flows.

Figure 7:
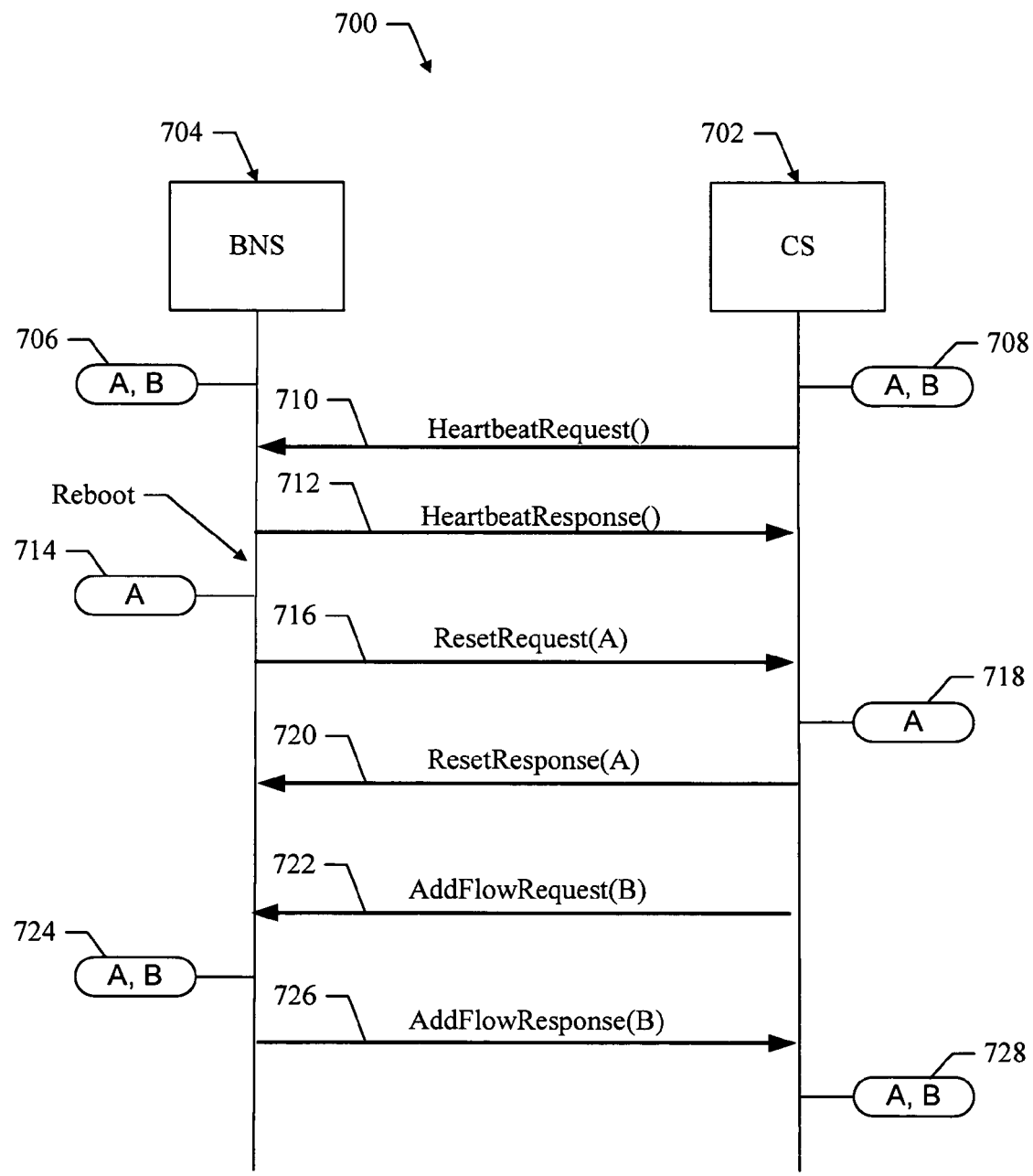
FIG. 7 shows one embodiment of a messaging protocol for use in embodiments of a transport system.

FIG. 7 shows one embodiment of a messaging protocol 700 for use in embodiments of a transport system. The messaging protocol 700 illustrates the operation of a heartbeat mechanism and a reset/re-sync mechanism between a BNS 704 and a CS 702.

At a selected point in time the state of the BNS 704 is that two flows (A and B) are registered for distribution over an access network, as shown at 706. The CS 702 also has the same state, as shown at 708.

The CS 702 then transmits a HeartbeatRequest message 326 to the BNS 704, as shown at 710. In response, the BNS 704 transmits a HeartbeatResponse message 328, as shown at 712. Thus, the CS 702 and the BNS 704 are able to monitor the state of the communication link between them to determine that the link is operational.

During the course of operation, a reboot occurs at the BNS 704 that causes the state of the BNS 704 to change. For example, the registration of flow B is lost, and as a result, the state of the BNS 704 indicates that only flow A is registered, as shown at 714.

The BNS 704 transmits a ResetRequest message 330 to the CS 702, as shown at 716. The ResetRequest message 330 comprises a list of registered flows at the BNS 704. For example, flow A is registered at the BNS 704.

In response to the ResetRequest message, the CS 702 updates its state to match the received list. For example, the CS 702 removes flow B from its state, which is shown at 718. The CS 702 then transmits a ResetResponse message 332 that comprises a list of registered flows at the CS 702 (i.e., flow A). As a result of the ResetRequest and ResetResponse messages, the states of the CS 702 and the BNS 704 have been synchronized.

The CS 702 then transmits an AddFlowRequest message 302 to the BNS 704 to add flow B, as shown at 722. The BNS 704 accepts the addition of flow B and adds flow B to its state of registered flows, as shown at 724. The BNS 704 then transmits an AddFlowResponse message 304 to the CS 702 to indicate that the flow B has been accepted for distribution. The CS 704 then updates its state to reflect that flow B is now registered for distribution, as shown at 728. Thus, in embodiments of the transport system, the heartbeat and reset/re-sync mechanism operate to allow the operation of the communication link between the CS 702 and the BNS 704 to be monitored, and their respective states to be reset and/or re-synchronized.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

Accordingly, while one or more embodiments of a transport system for the creation and transport of multimedia content flows across data networks have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for transporting a content flow from a content server to an access network for broadcast distribution to user devices coupled to the access network, the method comprising:
   transmitting a first request message from the content server to add the content flow for broadcast over the access network, wherein the request message comprises one or more flow parameters associated with the content flow;
   receiving a first response message at the content server indicating that the content flow associated with the one or more flow parameters will not be added for broadcast over the access network, the first response message further indicating one or more acceptable flow parameters;
   adjusting selected flow parameters associated with the content flow based on the one or more acceptable flow parameters included in the first response message;
   transmitting a second request message from the content server to add the content flow for broadcast over the access network, wherein the second request message comprises the adjusted flow parameters associated with the content flow;
   receiving a second response message at the content server indicating that the content flow associated with the adjusted flow parameters will be added for broadcast over the access network; and
   delivering the content flow from the content server to the access network.

2. The method of claim 1, further comprising:
   transmitting a subsequent request message from the content server to modify the content flow; and
   receiving a subsequent response message at the content server indicating that the modification to the content flow will be accepted.

3. The method of claim 1, further comprising:
   transmitting a subsequent request message from the content server to delete the content flow; and
   receiving a subsequent response message at the content server indicating that the content flow will be deleted.

4. The method of claim 1, further comprising:
   transmitting a subsequent request message from the content server to obtain a latency time of the content flow; and
   receiving a subsequent response message at the content server indicating the latency time of the content flow.

5. The method of claim 1, wherein the step of transmitting comprises transmitting the request message to add the content flow, wherein the content flow comprises a non real-time media clip.

6. The method of claim 1, wherein the step of delivering comprises transmitting the content flow over a bearer channel to the access network.

7. A method for transporting a content flow from a content server to an access network for broadcast distribution to user devices coupled to the access network, the method comprising:
   transmitting a request message from the content server to add the content flow for broadcast over the access network, wherein the request message comprises one or more flow parameters associated with the content flow;
   receiving a response message at the content server indicating that the content flow will not be added to the access network;
   adjusting selected flow parameters associated with the content flow to produce updated flow parameters in response to receiving the response message indicating that the content flow associated with the one or more flow parameters will not be added to the access network;

transmitting a new request message from the content server to add the content flow for broadcast over the access network, wherein the new request message comprises the updated flow parameters;

receiving a new response message at the content server indicating that the content flow associated with the updated flow parameters will be added for broadcast over the access network; and delivering the content flow from the content server to the access network in response to receiving the new response message indicating that the content flow associated with the updated flow parameters will be added for broadcast over the access network.

8. The method of claim 7, wherein said adjusting comprises adjusting the selected flow parameters associated with the content flow to produce the updated flow parameters, wherein the updated flow parameters comprise a rate parameter.

9. The method of claim 7, wherein said adjusting comprises adjusting the selected flow parameters associated with the content flow to produce the updated flow parameters, wherein the updated flow parameters comprise a quality of service parameter.

10. A method for transporting a content flow from a content server to an access network for broadcast distribution to user devices coupled to the access network, the method comprising:

transmitting a heartbeat request message from the content server;

receiving a heartbeat response message at the content server that indicates a communication link is operational;

transmitting a request message from the content server to add the content flow for broadcast over the access network, wherein the request message comprises one or more flow parameters associated with the content flow;

receiving a first response message at the content server indicating that the content flow associated with the one or more flow parameters will not be added for broadcast over the access network, the first response message further indicating one or more acceptable flow parameters;

adjusting selected flow parameters associated with the content flow based on the one or more acceptable flow parameters included in the first response message;

transmitting a second request message from the content server to add the content flow for broadcast over the access network, wherein the second request message comprises the adjusted flow parameters associated with the content flow;

receiving a second response message at the content server indicating that the content flow associated with the adjusted flow parameters will be added for broadcast over the access network; and delivering the content flow from the content server to the access network.

11. The method of claim 10, further comprising:
transmitting a reset request message from the content server that identifies a first flow state; and
receiving a reset response message at the content server that identifies the first flow state.

12. The method of claim 10, further comprising:
receiving a reset request message at the content server that identifies a first flow state;
adjusting a current flow state to match the first flow state; and transmitting a reset response message from the content server that comprises the current flow state.

13. An apparatus for transporting a content flow from a content server to an access network for broadcast distribution to user devices coupled to the access network, the apparatus comprising:

a processor;

transmitting logic that operates to transmit a first request message from the content server to add the content flow for broadcast over the access network, wherein the request message comprises one or more flow parameters associated with the content flow;

receiving logic that operates to receive a response message at the content server indicating that the content flow associated with the one or more flow parameters will not be added for broadcast over the access network, the response message further indicating one or more acceptable flow parameters; and logic that operates to adjust selected flow parameters associated with the content flow based on the one or more acceptable flow parameters;

wherein the transmitting logic further operates to transmit a second request message from the content server to add the content flow for broadcast over the access network, wherein the request message comprises the adjusted flow parameters associated with the content flow; and wherein the receiving logic further operates to receive a response message at the content server indicating that the content flow associated with the adjusted flow parameters will be added for broadcast over the access network.

14. The apparatus of claim 13, wherein the transmitting logic operates to transmit a subsequent request message from the content server to modify the content flow, and the receiving logic operates to receive a subsequent response message at the content server indicating that the modification to the content flow will be accepted.

15. The apparatus of claim 13, wherein the transmitting logic operates to transmit a subsequent request message from the content server to delete the content flow, and the receiving logic operates to receive a subsequent response message at the content server indicating that the content flow will be deleted.

16. The apparatus of claim 13, wherein the transmitting logic operates to transmit a subsequent request message from the content server to obtain a latency time of the content flow, and the receiving logic operates to receive a subsequent response message at the content server indicating the latency time.

17. The apparatus of claim 13, wherein the content flow comprises a non real time media clip.

18. An apparatus for transporting a content flow from a content server to an access network for broadcast distribution to user devices coupled to the access network, the apparatus comprising:

a processor;

logic for transmitting a request message from the content server to add the content flow for broadcast over the access network, wherein the request message comprises one or more flow parameters associated with the content flow;

logic for receiving the response message at the content server indicating that the content flow will not be added for broadcast over the access network;

logic for adjusting selected flow parameters associated with the content flow to produce updated flow parameters in response to receiving the response message indicating that the content flow associated with the one or more flow parameters will not be added for broadcast over the access network;
logic for transmitting a new request message from the content server to add the content flow for broadcast over the access network, wherein the new request message comprises the updated flow parameters;
logic for receiving a new response message at the content server indicating that the content flow associated with the updated flow parameters will be added for broadcast over the access network; and
logic for delivering the content flow from the content server to the access network in response to receiving the new response message indicating that the content flow associated with the updated flow parameters will be added for broadcast over the access network.

19. The apparatus of claim 18, wherein said logic for adjusting comprises logic for adjusting the selected flow parameters associated with the content flow to produce the updated flow parameters, wherein the updated flow parameters comprise a rate parameter.

20. The apparatus of claim 18, wherein said logic for adjusting comprises logic for adjusting the selected flow parameters associated with the content flow to produce the updated flow parameters, wherein the updated flow parameters comprise a quality of service parameter.

21. An apparatus for transporting a content flow from a content server to an access network for broadcast distribution to user devices coupled to the access network, the apparatus comprising:
means for transmitting a request message from the content server to add the content flow for broadcast over the access network, wherein the request message comprises one or more flow parameters associated with the content flow;
means for receiving a response message at the content server indicating that the content flow will not be added for broadcast over the access network;
means for adjusting selected flow parameters associated with the content flow to produce updated flow parameters in response to receiving the new response message indicating that the content flow associated with the updated flow parameters will not be added for broadcast over the access network;
means for transmitting a new request message from the content server to add the content flow for broadcast over the access network, wherein the new request message comprises the updated flow parameters;
means for receiving a new response message at the content server indicating that the content flow associated with the updated flow parameters will be added for broadcast over the access network; and
means for delivering the content flow from the content server to the access network in response to receiving the new response message indicating that the content flow associated with the updated flow parameters will be added for broadcast over the access network.

22. The apparatus of claim 21, wherein said means for adjusting comprises means for adjusting the selected flow parameters associated with the content flow to produce the updated flow parameters, wherein the updated flow parameters comprise a rate parameter.

23. The apparatus of claim 21, wherein said means for adjusting comprises means for adjusting the selected flow parameters associated with the content flow to produce the updated flow parameters, wherein the updated flow parameters comprise a quality of service parameter.

24. A non-transitory computer-readable medium having stored thereon processor-executable instructions configured to be executed by a processor of a server, the stored processor-executable instructions comprising:
instructions for transmitting a request message from a content server to add a content flow for broadcast over an access network, wherein the request message comprises one or more flow parameters associated with the content flow;
instructions for receiving a response message at the content server indicating that the content flow will not be added for broadcast over the access network;
instructions for adjusting selected flow parameters associated with the content flow to produce updated flow parameters in response to receiving the new response message indicating that the content flow associated with the updated flow parameters will be added for broadcast over the access network;
instructions for transmitting a new request message from the content server to add the content flow for broadcast over the access network, wherein the new request message comprises the updated flow parameters;
instructions for receiving a new response message at the content server indicating that the content flow associated with the updated flow parameters will be added for broadcast over the access network; and
instructions for delivering the content flow from the content server to the access network in response to receiving the new response message indicating that the content flow associated with the updated flow parameters will be added for broadcast over the access network.

25. The non-transitory computer-readable medium of claim 24, wherein said instructions for adjusting comprise instructions for adjusting the selected flow parameters associated with the content flow to produce the updated flow parameters, wherein the updated flow parameters comprise a rate parameter.

26. The non-transitory computer-readable medium of claim 24, wherein said instructions for adjusting comprise instructions for adjusting the selected flow parameters associated with the content flow to produce the updated flow parameters, wherein the updated flow parameters comprise a quality of service parameter.

27. A method for transporting a content flow from a content server to an access network for broadcast distribution to user devices coupled to the access network, the method comprising:
receiving a request message from the content server to add the content flow for broadcast over the access network at a scheduled time, wherein the request message comprises one or more flow parameters associated with the content flow;
determining that the content flow will not be added for broadcast over the access network based on the one or more flow parameters;
transmitting a response message to the content server indicating that the content flow will not be added for broadcast over the access network;
receiving a new request message from the content server to add the content flow for broadcast over the access network, wherein the new request message comprises updated flow parameters;
transmitting a new response message to the content server indicating that the content flow associated with the updated flow parameters will be added for broadcast over the access network and including a flow handle that identifies a flow in the access network; and receiving the content flow at the access network at the scheduled time indicated in the first request message.

28. The method of claim 27, further comprising:
receiving a subsequent request message from the content server to modify the content flow; and
transmitting a subsequent response message to the content server indicating that the modification to the content flow is accepted.

29. The method of claim 27, further comprising:
receiving a subsequent request message from the content server to delete the content flow; and
transmitting a subsequent response message to the content server indicating that the content flow will be deleted.

30. The method of claim 27, further comprising:
receiving a subsequent request message from the content server to obtain a latency time of the content flow; and
transmitting a subsequent response message to the content server indicating the latency time of the content flow.

31. The method of claim 27, wherein the step of receiving the request message comprises receiving the request message to add the content flow, wherein the content flow comprises a non real-time media clip.

32. The method of claim 27, wherein the step of receiving the content flow comprises receiving the content flow over a bearer channel.

33. The method of claim 27, further comprising broadcasting the content flow over the access network.

34. An apparatus for transporting a content flow from a content server to an access network for broadcast distribution to user devices coupled to the access network, the apparatus comprising:
a processor;
logic configured to receive a first request message from the content server to add the content flow for broadcast over the access network at a scheduled time, wherein the request message comprises one or more flow parameters associated with the content flow;
logic configured to determine that the content flow will not be added for broadcast over the access network based on the one or more flow parameters;
logic configured to transmit a first response message to the content server indicating that the content flow associated with the one or more flow parameters will not be added for broadcast over the access network, the first response message further indicating one or more acceptable flow parameters;
logic configured to receive a second request message from the content server to add the content flow for broadcast over the access network at a scheduled time, wherein the request message comprises one or more of the acceptable flow parameters associated with the content flow;
logic configured to transmit a second response message to the content server indicating that the content flow associated with the one or more acceptable flow parameters will be added for broadcast over the access network and including a flow handle that identifies a flow in the access network upon determining the content flow will be added; and
logic configured to receive the content flow at the access network at the scheduled time.

35. The apparatus of claim 34, wherein said logic configured to receive the request message comprises logic configured to receive a subsequent request message from the content server to modify the content flow, and said logic configured to transmit comprises logic configured to transmit a subsequent response message to the content server indicating that the modification to the content flow will be accepted.

36. The apparatus of claim 34, wherein said logic configured to receive the request messages comprises logic configured to receive a subsequent request message from the content server to delete the content flow, and said logic configured to transmit comprises logic configured to transmit a subsequent response message to the content server indicating that the content flow will be deleted.

37. The apparatus of claim 34, wherein said content flow comprises a non realtime media clip.

38. The apparatus of claim 34, wherein said logic configured to receive the content flow comprise logic configured to receive the content flow over a bearer channel.

39. The apparatus of claim 34, further comprising logic configured to broadcast the content flow over the access network.

40. A non-transitory computer-readable medium having stored thereon processor-executable instructions configured to be executed by a processor of a server, the stored processor-executable instructions comprising:
instructions for receiving a request message from a content server to add a content flow for broadcast over an access network at a scheduled time, wherein the request message comprises one or more flow parameters associated with the content flow;
instructions for determining that the content flow will not be added for broadcast over the access network based on the one or more flow parameters;
instructions for transmitting a first response message to the content server indicating that the content flow associated with the one or more flow parameters will not be added for broadcast over the access network, the first response message further indicating one or more acceptable flow parameters;
instructions for receiving a second request message from the content server to add the content flow for broadcast over the access network at a scheduled time, wherein the request message comprises one or more of the acceptable flow parameters associated with the content flow;
instructions for transmitting a second response message to the content server indicating that the content flow associated with the one or more acceptable flow parameters will be added for broadcast over the access network and including a flow handle that identifies a flow in the access network upon determining the content flow will be added; and
instructions for receiving the content flow at the access network at the scheduled time.

* * * * *